United States Patent
Blázquez-Sánchez et al.

(10) Patent No.: US 11,530,946 B2
(45) Date of Patent: Dec. 20, 2022

(54) METHOD AND DEVICE FOR DETECTING A FOCAL POSITION OF A LASER BEAM

(71) Applicant: Precitec GmbH & Co. KG, Gaggenau (DE)

(72) Inventors: David Blázquez-Sánchez, Gaggenau (DE); Niklas Weckenmann, Rastatt (DE); Florian Opitz, Offenburg (DE); Georg Sporl, Rheinstetten (DE)

(73) Assignee: Precitec GmbH & Co. KG, Gaggenau (DE)

( * ) Notice: Subject to any disclaimer, the term of this patent is extended or adjusted under 35 U.S.C. 154(b) by 177 days.

(21) Appl. No.: 16/956,785

(22) PCT Filed: Dec. 11, 2018

(86) PCT No.: PCT/EP2018/084303
§ 371 (c)(1),
(2) Date: Jul. 7, 2020

(87) PCT Pub. No.: WO2019/121145
PCT Pub. Date: Jun. 27, 2019

(65) Prior Publication Data
US 2021/0003445 A1 Jan. 7, 2021

(30) Foreign Application Priority Data
Dec. 22, 2017 (DE) .................. 102017131224.2

(51) Int. Cl.
*G01J 1/42* (2006.01)
(52) U.S. Cl.
CPC .................. *G01J 1/4257* (2013.01)

(58) Field of Classification Search
CPC .................. B23K 26/032; B23K 26/048; B23K 26/0643; B23K 26/0648; B23K 26/705;
(Continued)

(56) References Cited

U.S. PATENT DOCUMENTS

| 4,374,324 A | 2/1983 | Van Rosmalen et al. |
| 4,728,785 A | 3/1988 | Ohnuki et al. |

(Continued)

FOREIGN PATENT DOCUMENTS

| DE | 4426931 C1 | 8/1995 |
| DE | 19630607 C1 | 10/1997 |

(Continued)

OTHER PUBLICATIONS

International Search Report dated Aug. 5, 2019; International Application No. PCT/EP2018/084303.

*Primary Examiner* — Hina F Ayub
(74) *Attorney, Agent, or Firm* — Dinsmore & Shohl LLP

(57) ABSTRACT

A method and a device for detecting a focal position of a laser beam, particularly a machining laser beam in a laser machining head, includes an optical element which is arranged in the laser beam converging toward the focal point and which is designed to outcouple a reflection from the laser beam path, and a sensor arrangement which is designed to detect beam characteristics of said laser beam in the region of the focal point in the laser extension direction, and which measures the outcoupled reflection of the laser beam at least two locations that are offset to one another in the extension direction, in order to determine the current focal position.

14 Claims, 5 Drawing Sheets

(58) Field of Classification Search
CPC ..... B23K 26/707; G01J 1/0411; G01J 1/0414; G01J 1/0448; G01J 1/4257; G02B 7/08
See application file for complete search history.

(56) References Cited

U.S. PATENT DOCUMENTS

| | | |
|---|---|---|
| 5,459,565 A | 10/1995 | Aharon |
| 8,988,673 B2 | 3/2015 | Guttman et al. |
| 9,511,450 B2 | 12/2016 | Weick |

FOREIGN PATENT DOCUMENTS

| | | |
|---|---|---|
| DE | 102009059245 A1 | 6/2011 |
| DE | 102010039633 A1 | 2/2012 |
| DE | 102011054941 B3 | 1/2013 |
| DE | 102015001421 A1 | 8/2016 |
| DE | 102015106618 B4 | 4/2017 |
| EP | 2952861 A1 | 12/2015 |
| JP | S61242779 A | 10/1986 |
| JP | 2000094173 A | 4/2000 |
| JP | 2006113198 A | 4/2006 |
| WO | 2012021311 A2 | 2/2012 |

METHOD AND DEVICE FOR DETECTING A FOCAL POSITION OF A LASER BEAM

CROSS-REFERENCE TO RELATED APPLICATION

This application is the U.S. national stage of PCT/EP2018/084303 filed Dec. 11, 2018, which claims priority of patent application DE 10 2017 131 224.2 filed Dec. 22, 2017. The entire content of each application is incorporated herein by reference.

FIELD OF THE INVENTION

The invention relates to a method and a device for detecting a focal position of a laser beam, in particular a machining laser beam in a laser machining head. Such methods and devices are used for monitoring and controlling the focal position in a laser machining head during laser material machining.

BACKGROUND OF THE INVENTION

A problem in laser material machining is the so-called "thermal lens" (thermally induced change in refractive power) due to the heating of optical elements for laser beam guidance and focusing by laser power, especially in the multi-kilowatt range, and the temperature dependence of the refractive index of optical glasses. During laser material machining, the thermal lens results in a focus shift along the beam propagation direction, the shift having a negative effect on the machining of a workpiece. To guarantee machining quality, it is therefore desirable to have control over the focal position by measuring it. Therefore, it is necessary to detect the respective focal position and to compensate for the focal position shift, that is, to provide fast and precise focal position control.

Various methods and devices for determining the focal position of a laser beam are known. The problem lies in the integration of these methods and devices into a laser machining head in order to ensure precise focal position measurement in real time during a laser material machining process.

The international standard ISO 11146 specifies methods for measuring laser beams, in particular testing methods for laser beam parameters. In particular, it specifies how beam dimensions such as beam widths (diameter), divergence angle, beam propagation factor, diffraction index and beam quality are to be measured. In order to determine the focal position, that is, the position of the smallest diameter of the beam, the beam diameter is determined at at least ten points along the beam path. The change in beam diameter is described mathematically with the so-called beam caustic depending on the beam propagation direction. By matching the measured beam diameter with the beam caustic, both the focal position and all other laser beam parameters are determined.

The current state of the art integrates a focal position control into a laser material machining head in order to track the focal position in real time during laser material machining.

In order to be able to compensate for the variation in the focal position due to a thermal lens, the extent of the thermal lens is recorded during the machining of a workpiece by measuring the temperature of a lens with a temperature sensor, as described in JP 2000 094 173 A. Then, a control device drives a drive motor to move a lens in the beam propagation direction so that the focal position is correctly aligned with a workpiece to be machined.

According to DE 10 2015 106 618 B4, the focal position control due to the laser power is performed using an appropriate characteristic diagram that describes the focus shift as a function of the laser power.

With such methods and devices allowing for focal position control without measuring the actual focal position, an improvement in the machining quality can be achieved with minimal construction effort. However, high precision in focal position control cannot be achieved, and therefore machining quality meeting highest quality requirements is not possible.

DE 10 2011 054 941 B3 describes a device for correcting the thermally induced shift of the focal position. The device is provided with a sensor for determining the current focal position of the laser beams, a computing unit for comparing the current focal position with a target focal position and for outputting correction data to a correction unit adjusting at least one optical element for correcting the focal position according to the correction data. For this purpose, a back reflection of the laser beam on the protective glass is imaged onto the sensor arranged at the location of the focus via the focusing lenses for the laser beam and an objective. Here, the reimaging by means of the focusing lenses is sometimes subject to considerable aberrations affecting the accuracy of the measurement and thus the focal position control.

DE 10 2011 007 176 A1 describes a device for focusing a laser beam onto a workpiece, comprising at least one transmissive optical element arranged at a tilt angle with respect to a plane perpendicular to the beam axis of the laser beam, and a spatially resolving detector for detecting laser radiation reflected back at the transmissive optical element. From image detected by the detector, e.g. by a CCD chip, an image evaluation device determines the size or diameter of the reflected laser radiation on the detector, from which the focal position for controlling the focal position can be determined in turn.

Here, the focal position is determined with greater construction effort. For this purpose, a fraction of the laser beam to be measured is decoupled and evaluated by a sensor unit at the location of the focus and perpendicular to the direction of beam propagation. If a change in focal position due to a thermal lens is caused in such a device, the focal position sensor detects a change in the beam diameter. A computing unit of the sensor unit connected downstream of the focal position sensor then determines an actual focal position by comparing the measured beam diameter with a known beam caustic of the laser beam determined by a reference measurement. The thermal lens does not only result in a focus shift, but also in deterioration in beam quality due to aberrations. This results in a change in the overall beam caustic including the focus diameter. The determination of the focal position by comparison with reference values is therefore not very precise.

DE 196 30 607 C1 describes a device for monitoring the energy of a laser beam. By tilting a window with respect to the axis of the laser beam, a part is decoupled from the laser beam and directed towards a detector. The detector is arranged in an image plane of an optics that images the laser beam onto a substrate and corresponds to the surface of the substrate.

Furthermore, from DE 10 2010 039 633 A1, a device for determining the focal position of a focused laser beam used for laser material machining along the laser beam axis is known, the device comprising: a selection means including a selection element arranged at a distance from the laser beam axis for selecting a partial beam of the focused laser beam extending at exactly one angle with respect to the laser beam axis, a detection means having a sensor element arranged at a distance from the laser beam axis in the beam path of the selected partial beam for detecting the intensity of the selected partial beam, and an evaluation means for determining the focal position of the laser beam. The device detects the maximum of the intensity of the selected partial beam when the focal position of the laser beam coincides with a reference focal position of the device. Thus, only a geometrical fraction of the laser beam, namely the marginal rays, is used for the focal position measurement.

The thermal lens is caused by a thermal gradient along the radial direction of the optical components. Because of the radial laser power distribution, the temperature and thus the change in refractive index is significantly higher in the center of the optics than at the edge. If only a fraction of the laser beam is measured, information about the thermal lens is lost and it is not possible to precisely determine its influence on the focal position. In case of a very pronounced thermal lens, spherical aberration is to be expected. Therefore, the marginal rays and the paraxial rays do not meet in the same focus because of the different temperatures at the edge and in the center of the optical components. In addition, fraction of power of marginal rays is less than that of the paraxial rays. If the focal position is only determined with the information of the marginal rays, only low measurement accuracy is to be expected.

U.S. Pat. No. 8,988,673 B2 describes a device for characterizing laser beams using measurements of scattered light from the laser beam. The systems use Rayleigh scattering from the laser beam propagating through the ambient air, so that no special scattering chambers or liquids are required for the measurements. Special extinction algorithms or filters are used to distinguish the scattered light from dust particles.

SUMMARY OF THE INVENTION

In view of the above, the object of the invention is to provide a method and a device for precise detection of a focal position of a laser beam, in particular a machining laser beam during laser material machining in real time, wherein said method or device can be integrated into a laser machining head in a structurally compact manner in order to allow for precise control of the focal position during a machining process.

This object is achieved by the device disclosed herein and by the method disclosed herein. Advantageous embodiments of the invention are also described.

According to the invention, a device for detecting a focal position of a laser beam, in particular a machining laser beam in a laser machining head, comprises an optical element arranged in the laser beam converging towards the focus for decoupling at least one back reflection from the laser beam path, and a sensor arrangement for detecting beam properties of the laser beam in the region of the focus along the direction of propagation thereof, said sensor arrangement measuring the decoupled reflection of the laser beam to determine the current focal position at at least two locations spaced from one another along the direction of propagation. In order to precisely determine the focal position of a working laser beam in real time during a laser machining process, a partial beam of the working laser beam is decoupled from the laser beam path in a first step, so that aberrations and thermal effects in the decoupled partial beam or back reflection are negligible. In a second step, the focal position of the partial beam, and thus also the focal position of the working laser beam, is determined using a sensor or detector by evaluating measured beam properties along the beam propagation direction, wherein the entire beam, that is to say the working laser beam, is used over the entire cross section thereof for determining the focal position.

It is expediently envisaged that the sensor arrangement has at least one spatially resolving detector preferably arranged so as to be displaceable along a beam propagation direction of the back reflection. In this way, the back reflection, and thus the machining laser beam represented thereby, can be measured at a variety of locations, so that not only real-time focal position control and correction is possible, but also beam diagnosis in accordance with ISO 11146. That means that no additional laboratory measuring device is necessary for output control. In an alternative embodiment of the invention, it is envisaged that the back reflection decoupled from the laser beam path can be directed onto the spatially resolving detector by means of a deflection element arranged to be displaceable along the beam propagation direction of the back reflection. This makes shorter displacement distances at equal measuring range possible.

Another embodiment of the invention is characterized in that the spatially resolving detector is arranged in a manner inclined with respect to the beam propagation direction of the back reflection, it being advantageous for increasing the possible measuring points along the beam propagation direction when the spatially resolving detector is movable to a plurality of positions which are inclined with respect to the beam propagation direction of the back reflection.

In a further embodiment of the invention allowing for a particularly simple evaluation of the measurement data, it is envisaged that the sensor arrangement comprises a non-spatially-resolving sensor or detector, in particular a power detector, preferably a photodiode, the position of which in the direction of propagation of the back reflection 30 may be changed relative thereto in order to measure the intensity of the back reflection near the beam axis at different locations.

In order to allow for a mechanically simple embedding of the device for detecting a focal position in a laser machining head, it is expedient if the decoupled back reflections are split into a plurality of partial reflections by means of a deflection unit, the optical paths of which from the last surface of a focusing optics to a sensor or detector of the sensor arrangement are different from one another. The deflection element may consist of one or more planar plates, so that a plurality of back reflections can be directed to the sensor or detector of the sensor arrangement simultaneously using several surfaces, each of which being associated with a location on the beam axis.

Here too, the sensor or detector of the sensor arrangement is expediently a spatially resolving sensor, which is a CCD, in particular a camera sensor or a line sensor, the alignment of which corresponds to the beam propagation direction of the split back reflection(s).

In another embodiment of the invention, it is envisaged that the decoupled back reflection is split into at least two partial reflections by at least one beam splitter and directed to at least two sensors or detectors of the sensor arrangement.

As an alternative thereto, is can also be envisaged for the sensor arrangement to comprise a scattering medium arranged along an optical axis of the back reflection, wherein, in order to observe the beam caustic, scattered light emanating from the rear reflection can be imaged onto a detector using an imaging optics.

A method according to the invention for detecting a focal position of a laser beam, in particular a machining laser beam in a laser machining head, is characterized by the following steps: decoupling at least one back reflection from the laser beam path by means of an optical element arranged in the laser beam converging towards the focus, detecting beam properties of the laser beam in the region of the focus along the direction of propagation thereof by means of a sensor arrangement, and measuring the decoupled back reflection of the laser beam in order to determine the current focal position at at least two locations spaced from one another along the direction of propagation.

As a beam property of the laser beam, the intensity of the back reflection near the beam axis, the beam diameter or scattered light emanating therefrom is detected and measured in order to observe the beam caustic.

In order to detect or measure the beam diameter of the back reflection at a plurality of locations spaced from one another along the direction of propagation, it is envisaged in one embodiment of the invention that a spatially resolving detector is moved into a plurality of positions inclined with respect to the beam propagation direction of the back reflection.

In order to be able to detect and measure the beam property at a plurality of locations along the beam propagation direction concurrently, it is expediently envisaged that the decoupled back reflection(s) are split by means of a deflection unit into a plurality of partial reflections, the optical paths of which from the last surface of a focusing optics to a sensor or detector of the sensor arrangement are different from one another such that each of the plurality of back reflections is associated with a different location on the beam axis.

BRIEF DESCRIPTION OF THE DRAWINGS

The invention is explained in more detail below with reference to the drawing.

DETAILED DESCRIPTION OF THE INVENTION

Figure 1:
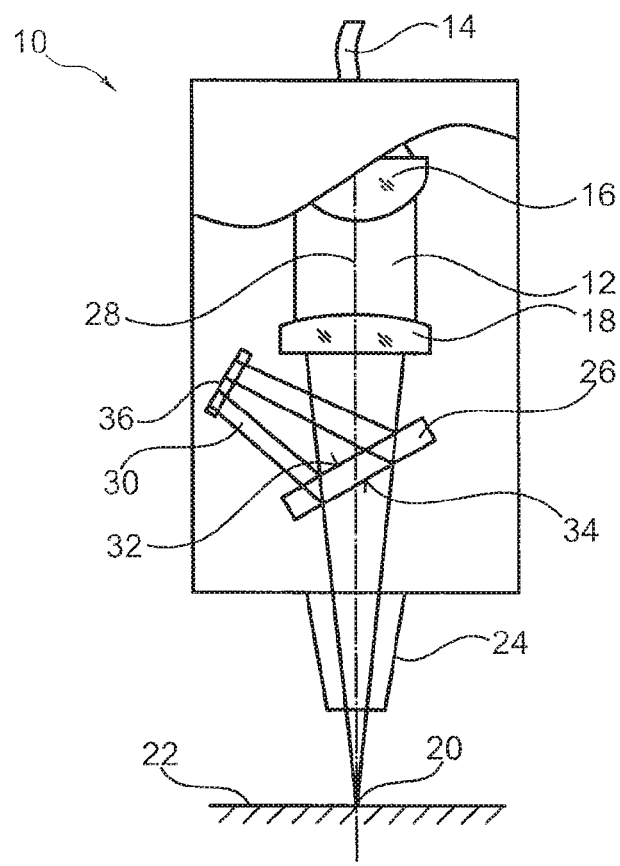
FIG. 1 shows a schematic simplified diagram of a laser machining head with a device according to the invention for detecting a focal position of a machining laser beam in a laser machining head during laser material machining.

In the different figures of the drawing, corresponding elements are designated with the same reference symbols.

FIG. 1 schematically shows a laser machining head 10, through which a machining laser beam 12 is guided. The machining laser light is provided to the laser machining head 10 via an optical fiber 14, for example. The machining laser beam 12 emerging from the optical fiber 14 is collimated by a first optics 16 and focused by a focusing optics 18 into a laser focus 20 on a workpiece 22. Usually, a protective glass 26 intended to protect the inside of the laser machining head 10 and in particular the focusing optics 18 from soiling, which can be caused, for example, by splashes or smoke, is arranged between the focusing optic 18 and a beam nozzle 24 through which the convergent machining laser beam 12 is focused onto the workpiece 22.

The first optics 16 and the focusing optics 18 are shown as individual lenses, but may also be lens groups, as is known. In particular, the first optics 16 may be formed by movable lenses of a zoom system, the lenses collimating the machining laser beam 12.

In order to decouple one or more back reflections 30 from the machining laser beam path for focal position measurement or control, the protective glass 26 is inclined relative to the optical axis 28 of the beam guiding optics in such a way that the angle between the optical axis 28 and the refractive and reflecting surfaces 32, 34 of the protective glass 26 is different from 90°. As shown schematically in FIG. 1, the back reflections 30 are directed onto a sensor arrangement 36. The sensor arrangement 36 may include a spatially resolving sensor or a non-spatially-resolving sensor, as will be explained in more detail below with reference to various embodiments of the invention.

Figure 2:
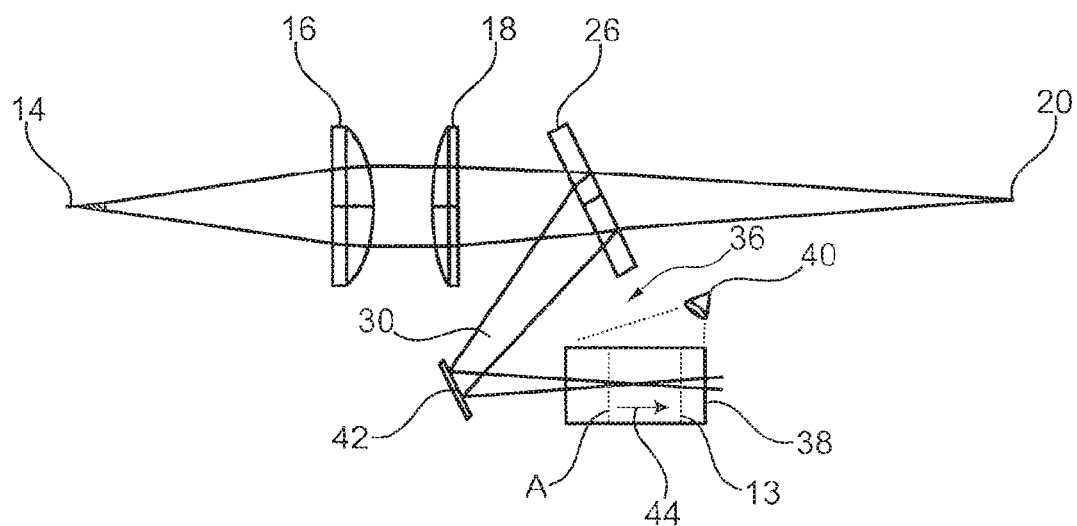
FIG. 2 shows a simplified diagram of the beam guiding optics of a laser machining head with a schematic illustration of a sensor arrangement for focal position control or measurement.

As is shown schematically in FIG. 2, at least one back reflection from an optical element of the beam guiding optics, e.g. the back reflection 30, is decoupled from the working laser beam path by the last transparent optical surface before the laser machining process. For example, the last protective glass 26 is arranged obliquely with respect to the optical axis for this purpose. However, another optical element (not shown here) arranged in the convergent working laser beam path may also be used for decoupling the back reflection 30. Advantageously, a protective glass 26 with an increased thickness is used to separate the two back reflections 30 indicated in FIG. 1 from both sides of the protective glass 26. The decoupled back reflection 30 is preferably measured from the last transparent optical surface by means of the sensor arrangement 36. Therefore, the beam measurement takes place separately from the machining laser beam path.

In order to determine the position of the laser focus 20 in real time, the beam properties of the machining laser beam 12 are evaluated along the beam propagation direction using the sensor arrangement 36, the back reflection 30 corresponding to the entire laser beam.

A first possibility is to determine the beam caustic. This has the advantage that all possible changes in the machining laser beam due to a thermal lens can be monitored. A second possibility is to determine the maximum laser intensity along the beam propagation direction. Here, the monitoring of other beam properties is omitted, while the focal position can still be captured in real time.

In order to adjust a focal position and to correct the focal position, at least one of the imaging optical elements of the beam guide optics, that is, in the example shown, the first optics 16 and/or the focusing optics 18, are arranged so as to be movable in the direction of their optical axis 28, so that they can be moved by a suitable actuator (not shown) in order to perform focal position correction. In order to carry out focal position correction on the basis of a detected focal position shift, an output signal of the sensor arrangement 36 is provided to an evaluation circuit (not shown) which determines the current focal position or location from the output signal of the sensor arrangement 36 and outputs an actuating signal for the actuator such that at least one optical element, for example the first optics 16, is displaced accordingly.

The back reflection 30 decoupled from the machining laser beam 12 is directed into a measuring region 38 of a sensor or detector 40 of the sensor arrangement 36, in which the laser power no longer has a measurable thermal influence. Here, a deflection mirror 42 may be provided here, as shown in FIG. 2, for example. In order to determine the focal position in real time, the sensor or detector 40 measures properties of the machining laser beam along its beam propagation direction 44. In particular, beam properties are measured in at least two different planes A, B perpendicular to the beam propagation direction 44.

Figure 3:
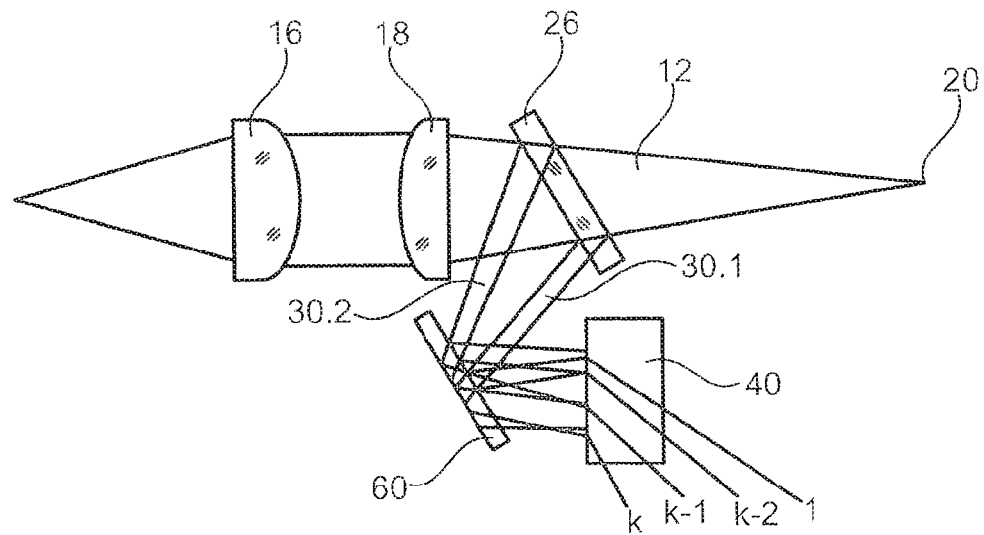
FIG. 3 shows a schematic diagram of the beam guiding optics according to FIG. 2 with a sensor arrangement for focal position control according to an embodiment of the invention.

As shown in FIG. 3, the two back reflections 30.1, 30.2, for example, are used by the last optical element of the beam guiding optics before the laser process, that is by the protective glass 26, for focal position measurement, in order to measure the machining laser beam at several positions along the beam propagation direction 44, and deflected with another transparent optical element, a deflection element 60, onto a spatially resolving sensor or detector 40. Any sensor may be used as the spatially resolving sensor or detector 40 by means of which a diameter of the laser beam incident on the sensor, that is the laser back reflection for beam measurement, can be determined. Expediently, however, a camera is used as the spatially resolving sensor or detector 40, the sensor surface of which is formed, for example, by a CCD sensor.

A plane-parallel plate may be provided as the deflection element 60. However, it is also possible to use a wedge plate as a deflection element 60, protective glass 26 or as a further deflection element in order to further separate from the points or regions of incidence of the individual partial back reflections on the spatially resolving sensor 40, that is on the sensor surface thereof. It is also possible to apply reflective coating to the rear surface of the deflection element 60 in order to avoid light losses for the corresponding back reflections. It is also conceivable to provide the front surface of the deflection element 60 with a coating, so that the intensity of the two incident rear reflections 30.1 and 30.2 is evenly distributed among the respective partial back reflections.

Due to the multiple back reflections produced in this way, the machining laser beam, in particular the beam diameter thereof in the region of the focus, can be measured at a plurality of points since the optical path of the light from the last surface of the focusing optics 18 to the sensor surface of the spatially resolving sensor or detector 40 is different for each of the back reflections, sometimes shorter and sometimes longer than the nominal focal length determining the focal position.

Figure 4:
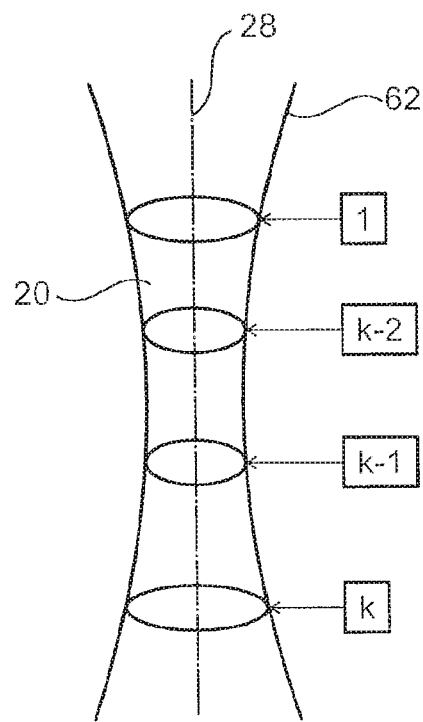
FIG. 4 shows a profile of laser beam caustics in the region of the laser focus, FIGS. 5 to 7 each show a schematic diagram of the beam guiding optics according to FIG. 2 with a sensor arrangement for focal position control according to various embodiments of the invention.

As shown in FIG. 3, the four back reflections generated from the two back reflections 30 by the protective glass 26 due to the multiple reflections at the deflection element 60, meet at the positions 1, k-2, k-1 and k. The beam diameters determined by the spatially resolving sensor 40 at these regions of its sensor surface are shown schematically in FIG. 4. It can be seen, therefore, that beam diameters that are located in front of the focus 20 are detected in regions 1 and k-2, while beam diameters in the regions k-1 and k are detected in locations that are behind focus 20. By measuring a plurality of beam diameters along the beam propagation direction in the region of the nominal focus 20, it is possible to approximately determine the beam caustic 62 in order to then determine the real focal position of the machining laser beam 12 from the beam caustic 62.

Figure 5:
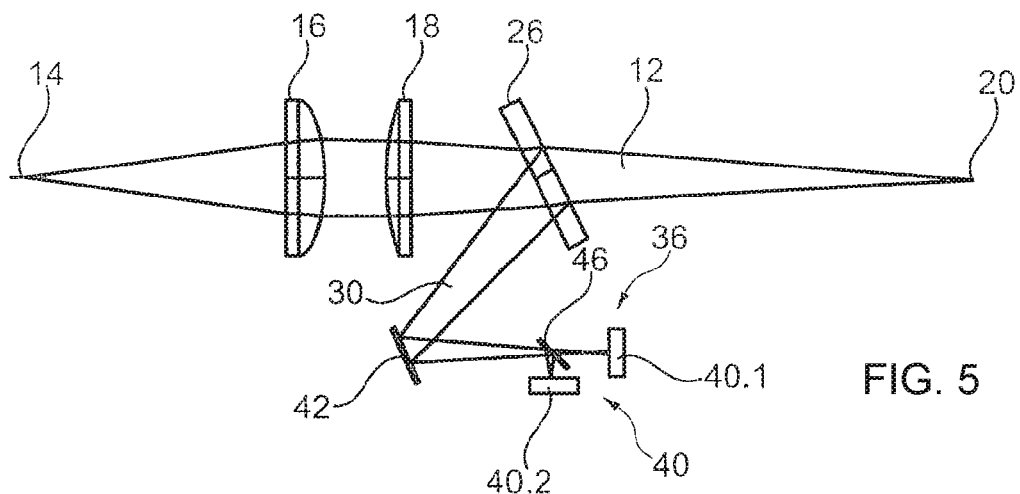

As shown in FIG. 5, the back reflection 30 to be measured is split into (at least) two beams by means of (at least) one beam splitter 46 and, for measuring the beam properties at (at least) two positions along the beam propagation direction 44, directed to (at least) two associated spatially resolving sensors or detectors 40.1 and 40.2 of the sensor arrangement 36. The detectors 40.1 and 40.2 are positioned perpendicular to the beam propagation direction 44. The detectors 40.1 and 40.2 can measure (at least) two beam diameters along the beam propagation direction in order to determine the beam caustic and therefrom the focal position for focal position correction.

Figure 6:
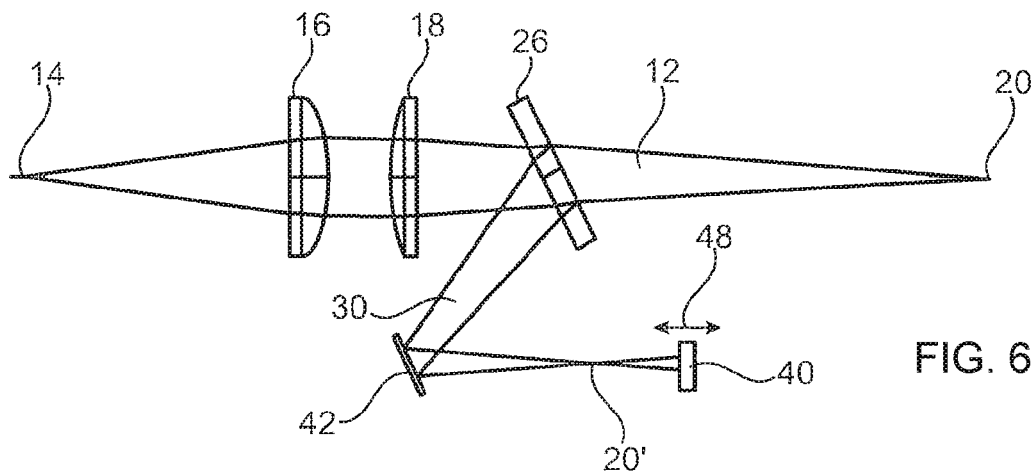

As indicated in FIG. 6 by a double arrow 48, the spatially resolving sensor or detector 40 is arranged perpendicular to the beam propagation direction 44 and is displaceable therealong. The detector 40 can thus measure the beam diameter of the back reflection 30 along the beam propagation direction 44 at a variety of positions in the region of the focus 20' of the back reflection 30. The focus 20' of the back reflection 30 corresponds to the focus 20 of the machining laser beam 12. By measuring the back reflection 30 in the region of its focus 20', the beam caustic of the machining laser beam 12 can thus be detected and evaluated for determining and correcting the focal position.

Figure 7:
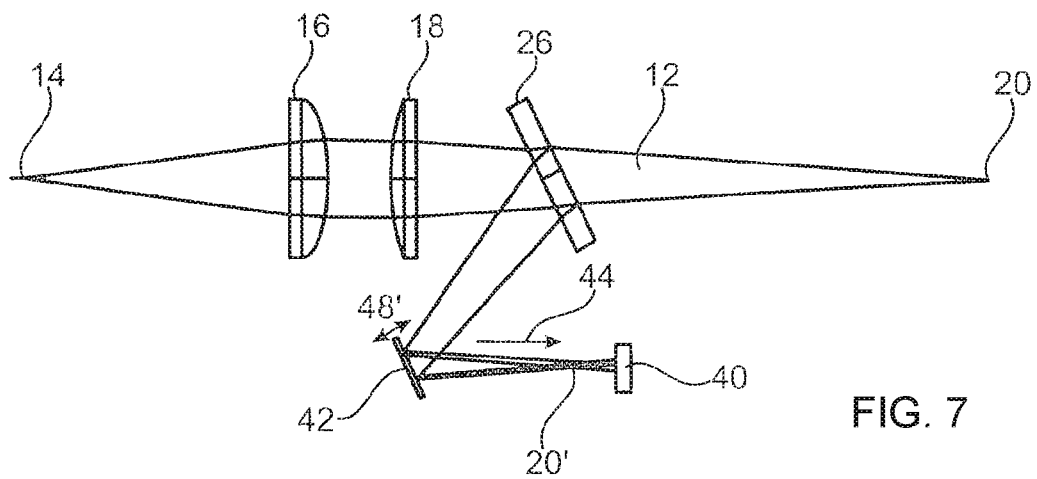

According to FIG. 7, in another embodiment of the invention, it is not the spatially resolving sensor or detector 14, but the deflection mirror 42 that can be moved, as indicated by the double arrow 48'. In comparison to the embodiment according to FIG. 6, a larger detector area is required here, but there is a smaller displacement path for the deflection mirror 42 since a displacement of the deflection mirror 42 essentially results in double the relative displacement of the sensor or detector 14 along the back reflection 30 in the beam propagation direction 44. This allows for a more compact design.

Figure 8:
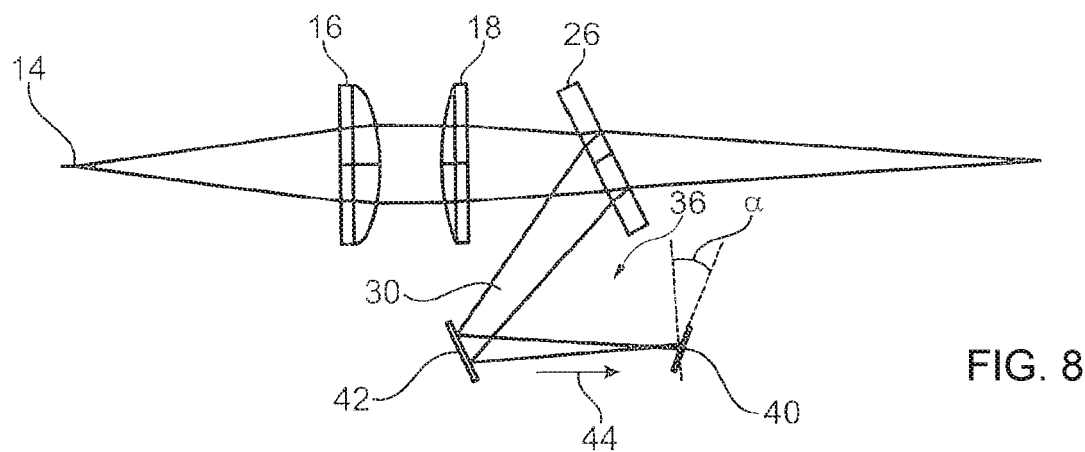
FIG. 8 shows a schematic diagram of the beam guiding optics according to FIG. 2 with a sensor arrangement according to a further embodiment of the invention, the spatially resolving sensor of which is arranged at a defined angle a with respect to the beam propagation direction, FIGS. 9a and 9b each show a schematic cross section through a laser beam caustic for illustrating the oblique arrangement of the spatially resolving sensor according to FIG. 8.

FIG. 8 shows another embodiment of the invention, wherein the spatially resolving sensor or detector 40 is arranged at a defined angle a with respect to the beam propagation direction.

Figures 9A, 9B, 9C:
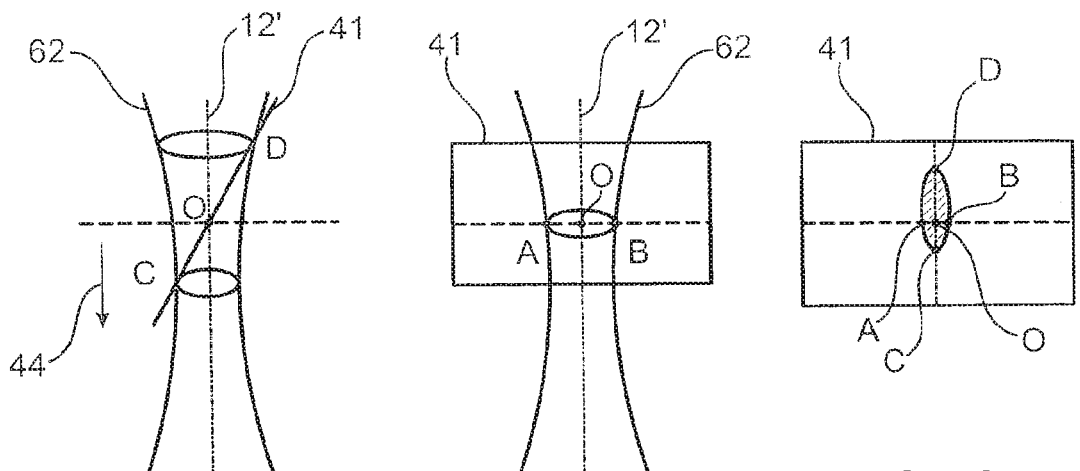
FIG. 9c shows a schematic diagram of the sensor plane of the spatially resolving sensor according to FIG. 8.

FIG. 9a shows a cross section through the back reflection 30 corresponding to the machining laser beam 12 shown as beam caustic 62 perpendicular to a sensor or camera plane 41, while FIG. 9b shows a cross section through the beam caustic 62 extending in the direction of propagation 44 of the machining laser beam 12 in parallel to the longitudinal extension of the sensor or camera plane 41 along with a plan view of the sensor or camera plane 41 of the tilted spatially resolving sensor or detector 40. FIG. 9c shows the elliptical image of the measured beam on the sensor or camera plane 41.

The measurement of the elliptical image of the beam, i.e. the beam caustic 62, at a defined tilt angle α allows for the calculation of the beam diameter at up to three positions along the beam propagation direction 44. For this purpose, the segment AB in the elliptical image of the measured beam and the segments OC and OD along the long axis of the ellipse are evaluated taking into account the angle α between the spatially resolving sensor or detector 40 and the beam axis 12'. While the segment AB in the elliptical image of the measured beam corresponds directly to the beam diameter in the center O of the sensor or detector plane 41, beam segments may be calculated from the segments OC and OD which are at locations axially offset from the center O along the beam axis. The distance of the position of the diameter in the direction z of the beam axis 12' results from the following equation: $z_1 = OD * \sin \alpha$, while the diameter d is calculated as follows: $d = 2 * r_1$, where $r_1 = OD * \cos \alpha$.

Another possibility is to turn or tilt the spatially resolving sensor or detector 40 by respectively defined angles $\alpha_j$. Depending on the angle $\alpha_j$, the spatially resolving sensor measures the segments $s_{j1}$ and $s_{j2}$ corresponding to the distances OD and OC. Based thereon, the corresponding beam radius and thus the beam diameter is determined as a function of the z position. With j different angles, this results in at least (2*j+1) different planes of the beam caustic along the beam propagation direction in which the beam diameter d can be measured for the approximate determination of the beam caustic 62.

Figure 10:
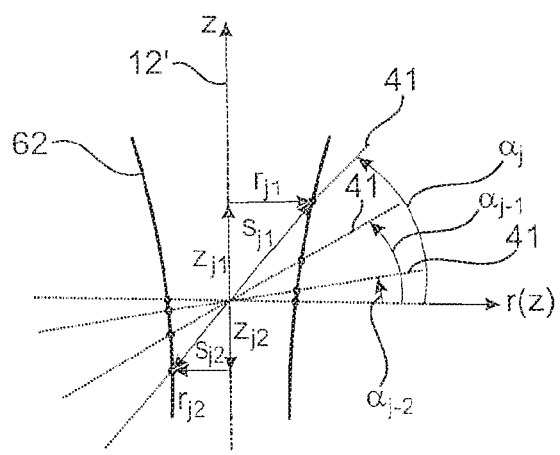
FIG. 10 shows a schematic cross section through a laser beam caustic similar to FIG. 9a for illustrating the measurement of a beam caustic at a defined tilt angle for detecting several beam diameters along the beam propagation direction, and FIGS. 11 to 13 each show a schematic diagram of the beam guiding optics according to FIG. 2 with a sensor arrangement for focal position control according to further embodiments of the invention.

The arrangement of the sensor or detector plane 41 at three different angles is shown schematically in FIG. 10. This results in 7 different beam diameters d at seven different locations $z_{j1}$, $z_{j2}$ along the beam axis 12' in the z direction. The diameters $d_{j1}$, $d_{j2}$ and the locations $z_{j1}$, $z_{j2}$ can be calculated as follows.

$$d_{j1} = 2 * r_{j1} \text{ with } r_{j1} = s_{j1} * \cos \alpha_j$$

$$z_{j1} = s_{j1} * \sin \alpha_j$$

Figure 11:
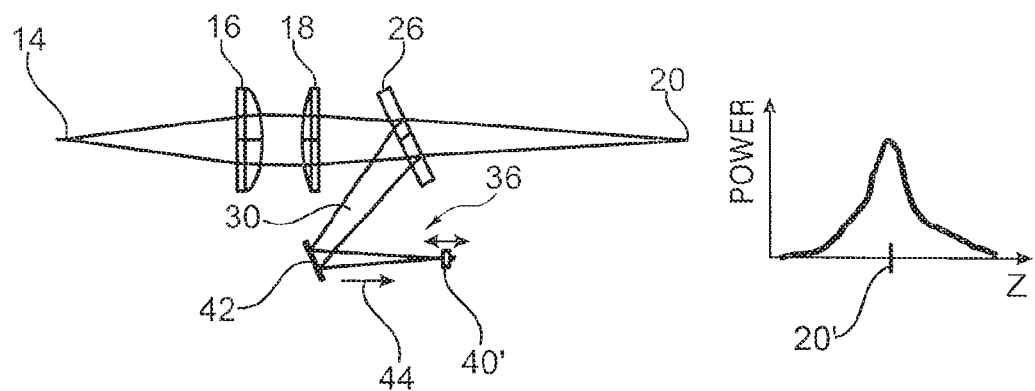

As shown in FIG. 11, a non-spatially-resolving sensor or detector 40', in particular a power detector such as a photodiode, is arranged displaceably in the direction of propagation 44 of the back reflection 30 in order to measure the intensity of the back reflection 30 near the beam axis thereof. The free aperture of this sensor may not be larger than the beam diameter d in focus 20'. With this arrangement, the measured intensity or power on the sensor reaches a maximum in the focus 20'. By displacing the sensor or detector 40' along the optical axis, the intensity or power distribution shown in the diagram in FIG. 11 can be measured along the direction of propagation 44. Therefrom, the focal position can then be determined according to the maximum of the distribution.

Figure 12:
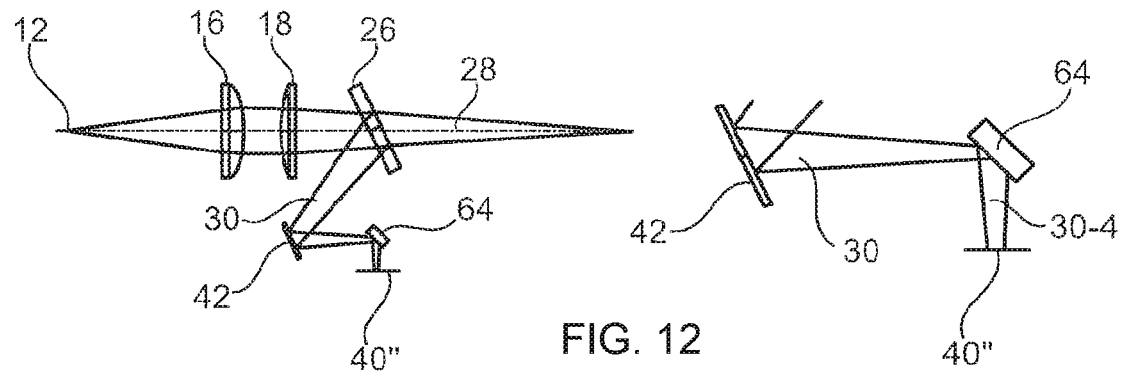

As shown in FIG. 12, a line sensor 40", to which a plurality of back reflections 30.n emanating from a deflection element 64 are provided, is used as the sensor or detector for measuring the power in the back reflection 30. The deflection element 64 consists, for example, of several stacked planar plates, so that a plurality of back reflections 30.n can be provided simultaneously using a plurality of surfaces, each of which can be associated with a location on the beam axis. The linear power distribution on the line sensor 40" correlates with the power density distribution along the optical axis 28, the maximum of which corresponds to the focal position, and can therefore be used for determining and correcting the focal position.

Figure 13:
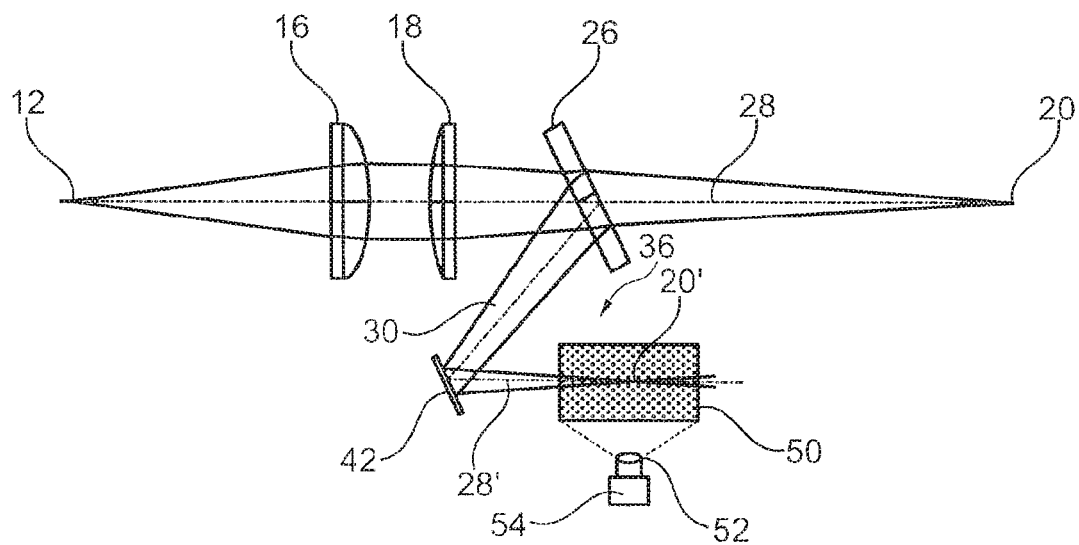

FIG. 13 shows another embodiment of the invention, wherein the back reflection 30 is guided by a scattering medium 50 arranged along its optical axis 28' in such a way that the focus 20' thereof is located in the region of the scattering medium 50 and the beam caustic in the region of the focus 20' can be observed for focal position determination and correction. The beam caustic is observed using an imaging optics 52, which images scattered light emanating from the back reflection 30 onto a detector 54.

The detector 54 may be a spatially resolving sensor such as a CCD recording the beam caustic, from which the focal position can be determined. However, it is also conceivable to use a line sensor for measuring the scattered light power for determining the focal position, the line sensor detects the profile of the scattered light intensity or power along the beam propagation direction. The maximum of the profile of the scattered light intensity or power then indicates the focal position.

For example, the imaging optics 52 may be an elliptical cavity, a parabolic reflector, or the like.

Advantageously, a solid transparent material with homogeneously distributed scattering elements, such as small particles, is used as a scattering medium 50. Due to the improvement in the production of particles in the submicrometer range, it is now possible to manufacture and use solid materials with very high transmission, which can scatter the light very homogeneously and efficiently for lighting purposes. This has the advantage that measurement artifacts caused by dust particles are not critical. Alternatives to this design of the scattering medium are movable elements such as a scattering wall along the optical axis or a rotating fan.

The invention claimed is:

1. A device for detecting a focal position of a machining laser beam in a laser machining head, the device comprising:
an optical element arranged in a portion of a path of said laser beam that is converging towards a focus, the optical element decoupling at least one back reflection from the laser beam path; and
a sensor arrangement for detecting beam properties of said laser beam in a region of said focus along a direction of propagation of said laser beam, said sensor arrangement measuring the decoupled at least one back reflection of said laser beam at at least two locations offset from each other along the direction of propagation of said laser beam for determining the focal position,
wherein said sensor arrangement includes a non-spatially-resolving sensor or detector, or a power detector, or a photodiode, a position of which is changeable in a direction of propagation of the decoupled at least one back reflection relative thereto in order to measure an intensity of the decoupled at least one back reflection near a beam axis thereof at different locations.

2. The device according to claim 1, wherein the decoupled at least one back reflection is split into at least two partial back reflections by at least one beam splitter and directed to at least two sensors or detectors of said sensor arrangement.

3. The device of claim 1, wherein the optical element is arranged in the direction of propagation of said laser beam after a focusing optics, between a focusing optics and a beam nozzle, or between a focusing optics and the focus.

4. A method for detecting a focal position of a machining laser beam in a laser machining head, the method comprising:

decoupling, by an optical element arranged in a portion of a path of said laser beam that is converging towards a focus, at least one back reflection from the laser beam path, detecting, by a sensor arrangement, beam properties of said laser beam in a region of said focus along a direction of propagation of said laser beam, and measuring, by said sensor arrangement, the decoupled at least one back reflection of said laser beam at at least two locations offset from one another along the direction of propagation of said laser beam for determining the focal position, wherein an intensity of the decoupled at least one back reflection near a beam axis thereof is measured at different locations by a non-spatially-resolving sensor or detector of said sensor arrangement, a position of which in a direction of propagation of the decoupled at least one back reflection is changeable relative thereto.

5. The method of claim 4, wherein the optical element is arranged in the direction of propagation of said laser beam after a focusing optics, between a focusing optics and a beam nozzle, or between a focusing optics and the focus.

6. A device for detecting a focal position of a machining laser beam in a laser machining head, the device comprising:
an optical element arranged in a portion of a path of said laser beam that is converging towards a focus, the optical element decoupling at least one back reflection from the laser beam path; and
a sensor arrangement for detecting beam properties of said laser beam in a region of said focus along a direction of propagation of said laser beam, said sensor arrangement measuring the decoupled at least one back reflection of said laser beam at at least two locations offset from each other along the direction of propagation of said laser beam for determining the focal position,
wherein the decoupled at least one back reflection is split by a deflection unit into a plurality of partial reflections, optical paths of which from a last surface of a focusing optics to a sensor or detector of said sensor arrangement are different from one another.

7. The device according to claim 6, wherein said deflection unit consists of one or more planar plates such that, by a plurality of surfaces, a plurality of back reflections can be directed to said sensor or detector of said sensor arrangement, each of the plurality of back reflections being associated with a location on a beam axis of the machining laser beam.

8. The device according to claim 6, wherein said sensor or detector of said sensor arrangement is a spatially resolving sensor.

9. The device according to claim 8, wherein said spatially resolving sensor is a CCD or a camera sensor or a line sensor, an orientation of which corresponds to a beam propagation direction of the split back reflections.

10. The device according to claim 8, wherein said spatially resolving sensor is arranged to be displaceable along a direction of propagation of the decoupled at least one back reflection.

11. The device according to claim 8, wherein the decoupled at least one back reflection is directed onto said deflection unit by a deflection element arranged to be displaceable along a direction of propagation of the decoupled at least one back reflection.

12. The device according to claim 8, wherein said spatially resolving sensor is arranged to be inclined with respect to a direction of propagation of the decoupled at least one back reflection.

13. The device according to claim 8, wherein said spatially resolving sensor is movable into a plurality of positions inclined with respect to a direction of propagation of the decoupled at least one back reflection.

14. A device for detecting a focal position of a machining laser beam in a laser machining head, the device comprising:
an optical element arranged in a portion of said laser beam that is converging towards a focus, the optical element decoupling at least one back reflection from the laser beam path; and
a sensor arrangement for detecting beam properties of said laser beam in a region of said focus along a direction of propagation of said laser beam, said sensor arrangement measuring the decoupled at least one back reflection of said laser beam at at least two locations offset from each other along the direction of propagation of said laser beam for determining the focal position,
wherein said sensor arrangement comprises a scattering medium arranged along an optical axis of the decoupled at least one back reflection, wherein, for observation of a beam caustic of said laser beam, scattered light emanating from the decoupled at least one back reflection is imageable onto a detector using an imaging optics.

* * * * *